(No Model.)

G. W. MANSFIELD.
MEANS FOR SUPPORTING OVERHEAD CONDUCTORS.

No. 371,336. Patented Oct. 11, 1887.

Witnesses
Geo. W. Breck
Carrie E. Ashley

Inventor
Geo. W. Mansfield,
By his Attorneys
Fowler & Fowler

United States Patent Office.

GEORGE WHITE MANSFIELD, OF CLEVELAND, OHIO.

MEANS FOR SUPPORTING OVERHEAD CONDUCTORS.

SPECIFICATION forming part of Letters Patent No. 371,336, dated October 11, 1887.

Application filed May 20, 1887. Serial No. 238,865. (No model.)

*To all whom it may concern:*

Be it known that I, GEORGE WHITE MANSFIELD, a citizen of the United States, residing at Cleveland, in the county of Cuyahoga and State of Ohio, have invented certain new and useful Improvements in Means for Supporting Overhead Conductors, of which the following is such a full, clear, and exact description as will enable any one skilled in the art to which it appertains to make and use the same, reference being had to the accompanying drawings, forming a part of this specification.

The improvements I have invented have been designed with reference to overhead conductors for electrical railways, wherein wires have to be supported as well as a device traveling thereupon for conveying the electrical current to the motor upon the car.

The object of my invention is to lessen the number of poles or supports for said conductors, and therefore to reduce the cost of the same, as well as to obviate the placing of so many obstructions in the street or way.

The invention consists in a pole or support having contrivances thereupon for supporting a conductor at points remote from the same, the said contrivances being preferably in the form of a vertical truss, which may be arranged in the direction of the length of the conductor.

Figure 1:
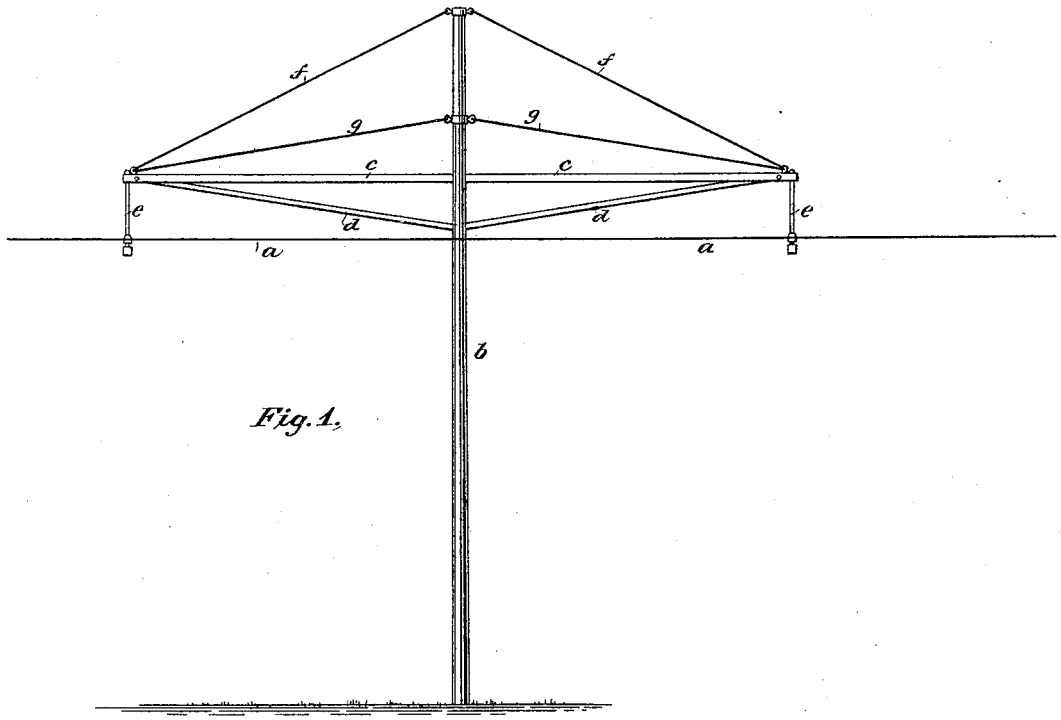
Figure 2:
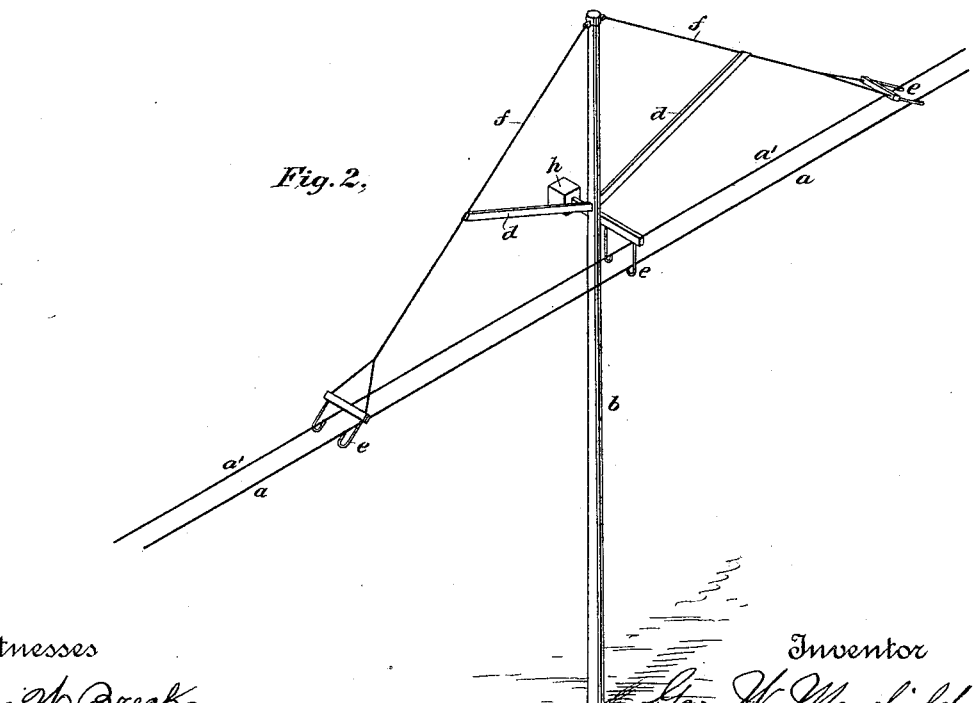

In the accompanying drawings, forming a part of this specification, Figure 1 represents an elevation of a structure embodying my invention, and Fig. 2 a perspective of a modified form of a structure embodying my invention.

The same letters of reference indicate corresponding parts in the two figures of the drawings.

$a$ designates a conductor, and $a'$ in Fig. 2 a return-conductor. $b$ is a pole for supporting the same, and has upon it a system of trussing or devices extending therefrom, which has depending from its ends supports $e$, for the conductor remote from the pole $b$.

The trussing represented in Fig. 1 is composed of rigid arms $c\ c$, extending from each side of the pole, having a strut, $d$, connected to each end thereof and to the pole, and two sets of ties, $g\ g$ and $f\ f$, connecting the pole and the ends of the arms $c\ c$. These ties may be made of wire, as they are subjected to tensile strains only. They may be connected to the pole $b$ in any manner desired to acquire the necessary strength. A column or any other support may be substituted for the pole $b$ without departing from the invention.

In Fig. 2 a modification of the above is illustrated, in which the arms $c\ c$ of Fig. 1 are dispensed with, and wires or cables $f\ f$, constituting ties, are fastened to the pole near the top thereof, and support the sustaining devices $e\ e$. From the pole $b$ extend struts $d\ d$, for preventing the cables $f\ f$ from sagging. In this figure is shown a direct and return wire, which are represented as supported at the pole by a sustaining device, $e$, as well as at points remote from the pole. The sustaining device $e$ at points remote from the pole should be fastened to the conductors $a\ a'$ in any suitable manner, and the device $e$ should be of such a character as to let the trolley or circuit-completing device pass the same without obstruction and make good contact with the conductors. In Fig. 2 is shown a counterpoise, $h$, extending from the pole so as to balance the weight of the conductors sustained at the other side of the pole, for the trussing must be arranged to support the conductors at one side of the pole, so as to permit the trolley to pass unobstructed; and to this end the arms $c\ c$ and the struts $d\ d$ may be arranged at a little distance from the pole.

It will be obvious from the foregoing and the following that any other form of trussing may be used without departing from the spirit of my invention, as the invention is not confined to any specific means of sustaining the conductors remote from the support. In double lines the same devices are used on the other side of the pole.

Having now set forth the construction of devices embodying my invention, I will now proceed to explain the advantages of the same, and to point out its practicability and usefulness. It is well known that the cost of providing an overhead system of conductors rests mainly in the cost of the poles or columns for supporting the same. It is a fact, also, that the objection to an overhead system of conductors for electrical railways particularly results from the number of poles or obstructions that have to be placed at the level of the way. My invention is designed to overcome this, and by means of it I may get along with, in some cases, one-third as many poles or supports as ordinarily employed. Let us suppose, for instance, that overhead conductors for electrical railways which sustain such heavy weights have to be supported at every twenty feet. If, then, the trussing be made to extend ten feet upon each side of the pole and the conductor-support at the end thereof, it will be obvious that I dispense with using a pole at $e\ e$, Fig. 1, and use only one pole, $b$, at the point intermediate thereof, and thus reduce the number of supports one-half, diminishing the number of obstructions at the level of the way in the same proportion, and materially reducing the cost of supporting the same. The trussing may be made of greater length still, if need be; but in practice ten feet at each side of the pole will be found most advantageous.

So far as I am aware, I believe myself to be the first to sustain a conductor at points re-remote from its support in substantially the manner described, with the advantages pointed out.

Having now fully set forth my invention and described its advantages, what I now desire to claim and secure by Letters Patent is—

1. As a means for suspending overhead conductors, a support, a system of trussing or other devices arranged in a vertical plane substantially parallel therewith and extending therefrom in the direction of the length of said conductors, and means for sustaining the same at the ends of said truss at points remote from the support, substantially as described.

2. The improvement in the art of suspending overhead conductors, which consists in vertically sustaining a conductor at points in the length thereof remote from its supporting-columns, substantially as and for the purpose described, whereby the number of supporting-columns and the cost of the same are reduced to a minimum, as set forth.

3. The combination of an overhead conductor, $a$, a support, $b$, therefor, a system of trussing arranged in substantially a vertical plane extending therefrom, and means for supporting the aforesaid conductor from the ends of said truss at points remote from said support, substantially as and for the purpose described.

In testimony whereof I have hereunto set my hand and seal, this 12th day of May, 1887, in the presence of the two subscribing witnesses.

GEORGE WHITE MANSFIELD. [L. S.]

Witnesses:
   CHAS. D. EVERETT,
   A. J. BRENNAN.